Patented Mar. 27, 1923.

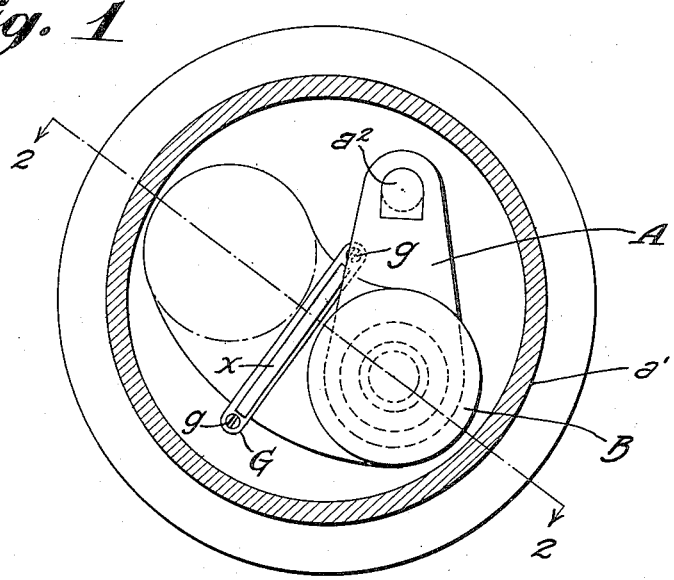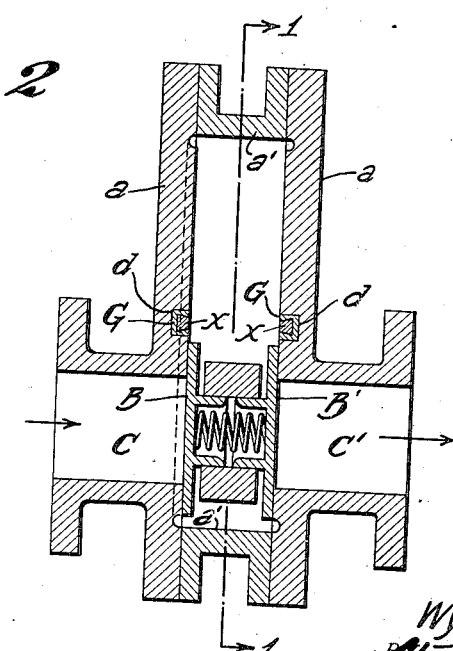

1,449,478

UNITED STATES PATENT OFFICE.

WYLIE G. WILSON, OF JERSEY CITY, NEW JERSEY, ASSIGNOR TO SLIDING VALVES INCORPORATED, A CORPORATION OF DELAWARE.

VALVE.

Original application filed June 25, 1917, Serial No. 176,755. Divided and this application filed March 9, 1922. Serial No. 542,365.

*To all whom it may concern:*

Be it known that I, WYLIE G. WILSON, a subject of the King of Great Britain, and resident of Jersey City, in the county of Essex and State of New Jersey, have invented certain new and useful Improvements Pertaining to Valves, of which the following is a specification.

This invention has to do with improvements in valves used in controlling the flow of corrosive liquids, vapors and gases, and among the objects of the invention may be enumerated the following: First, to preclude leakage in valves by filling up inequalities or irregularities in the cooperating faces of the valve and valve seat with a readily applicable medium, such as graphite; second, to heal small cuts, scratches, etc., produced during the grinding of a valve and its seat by an abrasive substance or a cutting tool during the manufacture of the valve; third, to preclude the scouring action on, or wire-drawing of, the valve incident to the passage of fluid, containing small solid particles, rapidly through the valve, and to fill up or heal scratches or cuts if the same should occur through such action; fourth, to minimize the coefficient of friction between the fluid passing through the valve and the valve and valve seat; fifth, to treat the operating faces of the valve and seat with a non-corrosive and protective substance for the purpose of precluding chemical action or corrosion upon the valve parts by gas, vapor or corrosive fluids, vapors or gases coming into contact therewith; sixth, to lubricate the faces of the valve and its seat for the purpose of reducing the friction and resistance to movement of the valve in conjunction with one or more of the other functions specified; seventh, to condition the surfaces of cast valve parts, with little or no machining or other mechanical treatment, to cooperate in a tight-fitting or liquid-impervious joint by filling up the interstices in the surfaces of said parts to such extent as to render their surfaces smooth and uninterrupted; eighth, to produce even and regular cooperating surfaces on the valve and valve seat for the purpose of precluding cross-currents and eddies between said cooperating faces, to minimize the scouring effect by producing plain, flat and uninterrupted surfaces against which the fluid passing through the valve impinges; ninth, to so condition the cooperating faces of the valve and its seat that no undue bonding action occurs between them, notwithstanding they are allowed to remain idle for an indefinite period, and, tenth, to increase the efficiency, ease of operation, and durability of the valve.

This application is divided from my co-pending application for the improvements pertaining to valves, Serial No. 176,755, filed June 25, 1917.

I have discovered, by exhaustive experiments with careful microscopic examinations, that, in the customary grinding of the valves and valve seats by abrasive stones or materials, such as emery or carborundum, particles of said stones, freed during the grinding operation, become permanently embedded in the surface pores of the metal, in the form of fine, diamond-like points or projections, which I have found are practically impossible to remove. When the valve is in service, during which it is slid to and fro over its seat, a slight, but continuous, cutting action results from the travel of these hard, sharp points, embedded in the valve face, over the valve seat, and vice versa. This results in the formation of small channels or cross-channels, and, while this action apparently is comparatively slight, its results are always disadvantageous, often serious, especially after long continued use of the valve. I have found that the foregoing effects are, in many cases, responsible for the subsequent leakage in valves which were initially tight.

Moreover, a microscopic examination of valves and valve seats which have been trued up by machining the faces thereof shows that the tool invariably leaves small scratches or uneven portions, so that said faces are not, in fact, absolutely true. Thus, under the best conditions, obtainable by the most accurate machinery, the cooperating surfaces of the valve and valve seat are invariably literally full of microscopic pits, ridges, and uneven portions, which, if the valve is used in this condition, will tend to produce cross-currents and eddies in the fluid passing through the valve and thereby increase the scouring effect of such fluid.

I have also observed from careful experiments that, in valves controlling the passage of fluid under high velocity, the small opening first produced during the gradual shifting of the valve to open position occasions a sudden rush of the fluid between the valve and valve seat which is generally accompanied by a scouring action on the cooperating faces of the valve and its seat, due to skin friction, and this is particularly true if any grit is in suspension in the fluid. The same condition results when the valve is partially closed during the movement of the valve from an open to a closed position. The scouring action, in either instance, produces at first, a microscopic groove or scratch thereby permitting slight leakage, but, as the leakage continues, the scouring at the affected portion of the face increases, so that a larger and larger groove results, until the leakage of the valve becomes pronounced and serious.

Recurring now to valve lubrication, which in conjunction with others is one of the factors of my broad invention, experiment has shown that the question of the lubrication of valves is a vital one. The broad field of lubrication is an old one and has been the subject of considerable study and experiment for centuries. However, such consideration has been limited almost entirely to bearings where fixed and movable parts are bound tightly together for relative rotation while in surface contact. The field of bearing lubrication has been highly developed, but little or no attention has been paid to the lubrication of valves. The problems of valve lubrication are, in fact, entirely different from those of bearing lubrication, since, in the latter case, the moving element turns by simple rotation, generally under substantially the same load at all times, and the bearing is usually so formed as to exclude the entrance of moisture, particles of dirt, or other foreign matter, between the cooperating surfaces of the bearing. Moreover, a bearing is not, at any time, subjected to the direct scouring or abrasive action of a fluid, since, if it is to be positioned where fluid will normally come in contact with it, it is customary to so house it as to exclude such contact. In the case of valves used to control the flow of corrosive fluids, or liquids, the conditions are just the opposite, the valve, whenever open, being subjected to the scouring action of the fluid coursing therethrough, which fluid comes into direct engagement with, or impinges on the valve and its seat. It is thus continually exposed to chemical action resulting from contact with the fluids which it controls, and to the physical action of the particles of grit carried by the fluid. Because of the scouring action of fluid passing through a valve, and the fact that the rapid rush of fluid therethrough is accompanied by considerable skin friction, it is apparent that the oils or greases generally employed for bearing lubrication are entirely unadapted to valve lubrication, since the rapid flow of fluid through the valve would soon carry off or decimate the lubricant to such extent that the parts would no longer be lubricated, and scouring, with consequent leakage of the valve, would result. This consideration does not enter into bearing lubrication, since the lubrication in bearings is, at all times, subjected to the wiping action of the parts, only, and is at no time exposed to the forward rush of a body of fluid at a high velocity.

Furthermore, it is not essential in bearings that the cooperating surfaces fit absolutely tight at all points, since the question of leakage does not enter into bearing construction. When it is desired to preclude leakage of a lubricant from a bearing, this is generally accomplished by providing suitable packing at either end of the bearing, whereas, in valve construction, leakage is a primary consideration, and such packings as are employed in bearings would serve no useful purpose in precluding leakage between a valve and its seat.

Another difference to be considered between bearing and valve lubrication is the fact that, when a bearing is to be left standing idle for any extended period of time, it is the practice to remove the cap of the pillow-block or otherwise substantially float the bearing in heavy oil or grease to protect its bearing surface against the action of the elements and obviate corrosion. When the bearing is to be subsequently operated, it is generally dismantled, the old grease or gum removed, and fresh lubricant introduced before the bearing is again placed in service. In the operation of valves, a valve is often left for a long extended period in closed position, to be subsequently opened for a short while and then closed again for another extended period, it being absolutely essential that, while the valve is closed, it shall provide an impervious seal devoid of leakage. However, the main difficulty with valves of the type under consideration is that, when left seated for an extended period, chemical action takes place between the valve and its seat, so that they become corroded or rusted tightly together, and it is necessary to "break the bond" before the valve can be moved from its seat. If the corrosion has progressed to a considerable degree, the moving of the valve is accomplished only with great difficulty, and it is not uncommon to break some part of the valve when applying sufficient force to break the bond. Although this difficulty has long been present in valve operation, no satisfactory means or method has ever been suggested for obviating the difficulty, due, mainly, to the fact that such means is necessarily required to withstand such varying conditions of pressure flow, skin friction, and the decimating influence of the fluid passing through the valve when said valve is opened, coupled with the further fact that the oxidizing or other chemical action, due to the presence of the corrosive fluid, has presented a problem in defective valve operation not heretofore solved.

For these reasons, although valves, and particularly slide valves, have long been used, they have never been lubricated except when such valves have been employed to control the flow of a lubricant through a system conveying such an agent, and then only incidentally and without any particular intent to lubricate the valve. This is true in oil conveying conduits in refineries, etc., but, in general practice, oil is really not a satisfactory lubricant, as it would, in the majority of cases, be carried off by the fluid or steam controlled by the valve. It is true that slide valves in steam engines are, at present, lubricated to some extent by oil carried by the steam, the oil being introduced into the steam during its passage to the slide valves and before it reaches the engine, but no means has ever been provided by which a valve is lubricated independently of the fluid which it controls.

With the foregoing considerations in mind, the main object of the present invention, speaking generally, is to cope with and overcome the detrimental features and disadvantages enumerated, which, as demonstrated by the experiments which I have conducted, have been shown to exist, and to accomplish these results in a simple and efficient manner and without necessitating the entire reorganization or changing of valve construction.

Features of the invention, other than those specified, will be apparent from the following description when read in conjunction with the accompanying drawings.

In the accompanying drawings, I have illustrated the present invention as adapted to a well known type of slide valve, but the showing herein made is to be understood as illustrative, only, and not as defining the limits of the invention.

Figure 1 is a transverse section through a valve embodying the present invention, the casing of the valve being shown in section as in the plane of the line 1—1 of Figure 2, but the remainder of the valve being shown in elevation in the interest of clearness.

Figure 2 is a section through the valve of Figure 1, taken in substantially the plane of the line 2—2 of said figure.

Although the drawings illustrate the present invention as adapted to a special environment, the underlying principle of its modus operandi is applicable to many valves and may be briefly stated as follows. It has been heretofore pointed out herein that a difficulty encountered in obtaining and maintaining tight valves is due to cuts or channels produced by the presence of particles of grit on the cooperating faces of the valve and its seat, as well as to unevennesses in said faces produced during the manufacture or subsequent operations of the valve. I have found that, by treating either or both of said faces with graphite or some similar material, the deleterious effects specified are obviated to a great extent, the formation or production of such effects, through the operation of the valve in controlling the flow of fluid therethrough, is overcome, and the wearing of said faces is minimized to such degree as to render the same inconsequential. I have further found out that by treating either or both faces with graphite, a valve is conditioned to withstand the deleterious effects to corrosive liquids, vapors and gases, and remain properly operable through long use when employed to control the flow of corrosive liquids or gases. This phase of the present invention is entirely independent of manufacturing problems and deals with the uses of valves.

In accordance with the present invention, means is provided whereby either or both of said faces are subjected to the graphite treatment during each operation of the valve, so that the graphite coating on said faces will not be dissipated by the passage of fluid through the valve, to leave the valve faces unprotected. In carrying out the present invention, the body of graphite may be placed in fixed position preferably adjacent the valve seat, thus when the valve is moved it will sweep over the body of graphite and will thereby be treated as being subjected to a graphite rubbing.

By this operation, the graphite is caused to fill any interstices in the valve seat or cooperating face for the purpose of making said surfaces true and smooth, to cushion or cover any particles of grit in said faces, to render said faces non-corrosive, and to eliminate friction, thereby assuring tight valves and rendering them more lasting, so that leakage is substantially obviated.

In the accompanying drawings, the manner in which the present invention may be utilized in various forms of valves is shown. In Figures 1 and 2, one manner of adapting the invention to the well known form of "everlasting valve" is illustrated. Valves of the type delineated have long been in use, but no means has heretofore been suggested for overcoming the disadvantages hereinbefore described as involved in their manufacture and maintenance. Speaking generally, they embody two face plates $a$, spaced apart by an annular ring $a'$ forming an interior valve chamber, within which an operating head A is mounted for oscillation on an operating stem $a^2$. Operating head A is in the form of an arm which carries a pair of sealing disks B B' adapted to simultaneously seal or unseal inlet and outlet ports C C', respectively, with which the valve chamber is provided.

In the operation of a valve of this character, the operating stem $a^2$ is manipulated to bodily oscillate the head A for the purpose of simultaneously moving both sealing disks B B' into or out of registration with the inlet and outlet ports of the valve. During the travel of the sealing disks, occasioned by this operation, the sealing faces of said disks slide in face-abutting relation over the inner faces of face plates $a$, so that, in carrying out the present invention, I find it desirable to treat both the inner faces of said face plates and the sealing faces of the sealing disks with the graphite.

To this end, and in the embodiment of Figures 1 and 2, the inner surfaces of the face plates $a$ are provided with depressed pockets $d$, and in these pockets are seated, and retained in place by screws $g$, graphite containers G, so positioned that the open sides of said containers will face interiorly of the valve chamber and will extend across the width of the path traversed by the sealing disks during the operations of sealing or unsealing the valve. Containers G are filled with graphite $x$, as shown best in Figure 2, so that each time the sealing disks rub over the open sides of said containers, particles of the graphite therein contained are deposited upon the faces of said sealing disks for the purpose specified.

In the form of valve illustrated which is a general sample of most valves, it is to be noted that the cooperating surfaces are subjected to the graphite treatment every time the valve is operated. It will be noted, moreover, that the body of graphite is so positioned that it is not subjected to the direct action, or positioned within the direct flow, of the fluid, the flow of which the valve controls. This I recommend, since said body of graphite, if positioned within the direct flow of the fluid, would be subjected to the scouring action of the same, particularly in a system where fluids, liquids or gases are handled under high pressure which action would serve to disseminate and waste the graphite.

By applying graphite to the cooperating faces of a valve and valve seat, as well as to the inner surface of the face plate over which the valve slides, said surfaces will be treated with a relatively thin film or protecting envelope of graphite which will serve to fill up any scratches, channels, or other depressions in said surfaces and render them perfectly smooth and even throughout their entire extents. Moreover, because of the lubricating characteristics of graphite, the actuation of the valve may be accomplished with greater ease, and, since graphite offers a resistance to the effect of alkalis, steam, most acids or water, corrosion will not set in and sticking of the valve will be precluded. Thus, a valve treated as described may be left standing for a long period without becoming stuck, so that, when it is desired to subsequently operate the same, it will not become necessary to "break the bond" before the valve can be moved from its seat.

Another important feature in the use of graphite resides in the fact that, when the surfaces of the valve parts are coated with such material, they are, in effect, provided with a protective coating which obviates skin friction by the fluid which the valve controls and, also, precludes the scouring action of the fluid from cutting into, scratching, or otherwise rendering the surfaces defective.

Furthermore, in case particles of grit become embedded in said surfaces of the valve during the manufacture thereof, and incident to the grinding operations, as specified, these grit particles, which normally form diamond-like cutting points, will be covered by the graphite and cutting action by these points, as normally, is overcome. However, even though some of such points are not in the first instance covered by the graphite, the operations of the valve and contemporaneous graphite treatments will cause the scratches made by these points to become filled as soon as they are formed. Thus, eddies, cross-currents, and other disadvantageous features, generally resulting from scratches, channels, or other unevennesses in the surfaces under consideration, are entirely obviated, and the valve is made to operate more easily and is so protected as to prolong its life.

Under these conditions, the application of graphite or similar material to the treated surfaces fills up all holes, depressions or irregularities in such surfaces, leaving the same smooth, and the contact of other surfaces, brought into operative relation therewith, causes the two surfaces to cooperate in making a perfect union between them and hence a satisfactory seal, the graphite compensating for the irregularities in such surfaces by filling the depressions between the elevations of each surface. Accordingly, valve faces may be employed, in certain cases, as they come from the casting operation, since it is possible to produce a refined casting, the surfaces of which will be sufficiently smooth to permit of their use in the manner hereinbefore described, through the employment of the graphite treatment, or said surfaces may be planed to an approximate fit, and, when treated with graphite as described, will produce a tight, impervious joint.

In the construction hereinbefore described, the graphite has been set forth as contained within a pocket formed directly in one of the machine parts, as packed within a container and movably pressed within said part. However, the invention may be carried out in different environments in the manner best adapted for the carrying out of its function, the showing herein made being for the purpose of illustration, only, and not limiting the invention to specific details.

While I have illustrated means for applying the graphite from one abutting face to another, I may find it useful and within the scope of my invention to provide graphite distributing means to both abutting faces.

I have observed an imperfection in valves arising from faulty construction which may be described as follows, whereas in the "everlasting" type of valve the movable member does not move absolutely in the plane of the faces of its casing, or even if it does so move it may not fit snugly within the casing. I have found in such cases that the graphite applied as stated compensates for such irregularities, eccentricities or insufficiencies, and that in the operation of the valve the graphite which will flow under pressure takes the course of least resistance and compensates for such imperfections, or eccentricities, retaining its position where it is so forced, thus establishing a perfect union and a tight fit, and yet one that facilitates the operation of the valve as hereinbefore set forth.

Throughout the foregoing description, the phrase "solid body of graphite" has been frequently employed, this term having been used to differentiate from liquid lubricants and oils of low viscosity. By the term "body" is meant a well defined mass, such as would be contained in a pocket, as described, which mass is preferably a mobile body, the graphite being preferably ground and packed within the pocket either alone or in combination with a binding agent. The graphite, when packed within the containing pocket, appears, to all intents and purposes, as solid, but it may be readily rubbed upon a cooperating surface to treat the same with a relatively thick or thin filament or envelope as occasion may require.

Having thus fully described the invention, what I claim as new, and desire to secure by Letters Patent, is:

1. In a valve of the class described, a valve chamber, an inlet and outlet to said chamber, a valve seat, a sealing member cooperating with said seat for controlling the flow of material through the outlet, a substantially sealed body of lubricant so positioned within the chamber that the sealing member is caused to traverse the same during the operations of opening and closing the valve, said body of lubricant being so positioned that it is out of engagement with the sealing member when said sealing member occupies either extreme position.

2. In a valve of the class described, a valve chamber, an inlet and outlet to said chamber, a valve seat, a sealing member cooperating with said seat for controlling the flow of material through the outlet, a substantially sealed body of lubricant so positioned within the chamber that the sealing member is caused to traverse the same during the operations of opening and closing the valve, said body of lubricant being so positioned that it is out of engagement with the sealing member when said sealing member occupies either extreme closed or open position, and separate pockets for holding the lubricating material.

Signed by me at New York, N. Y., this 8th day of March, 1922.

WYLIE G. WILSON.

Witnesses:
    Dorothy Frank Scheiber,
    Sadie H. Oliker.